United States Patent Office 3,636,067
Patented Jan. 18, 1972

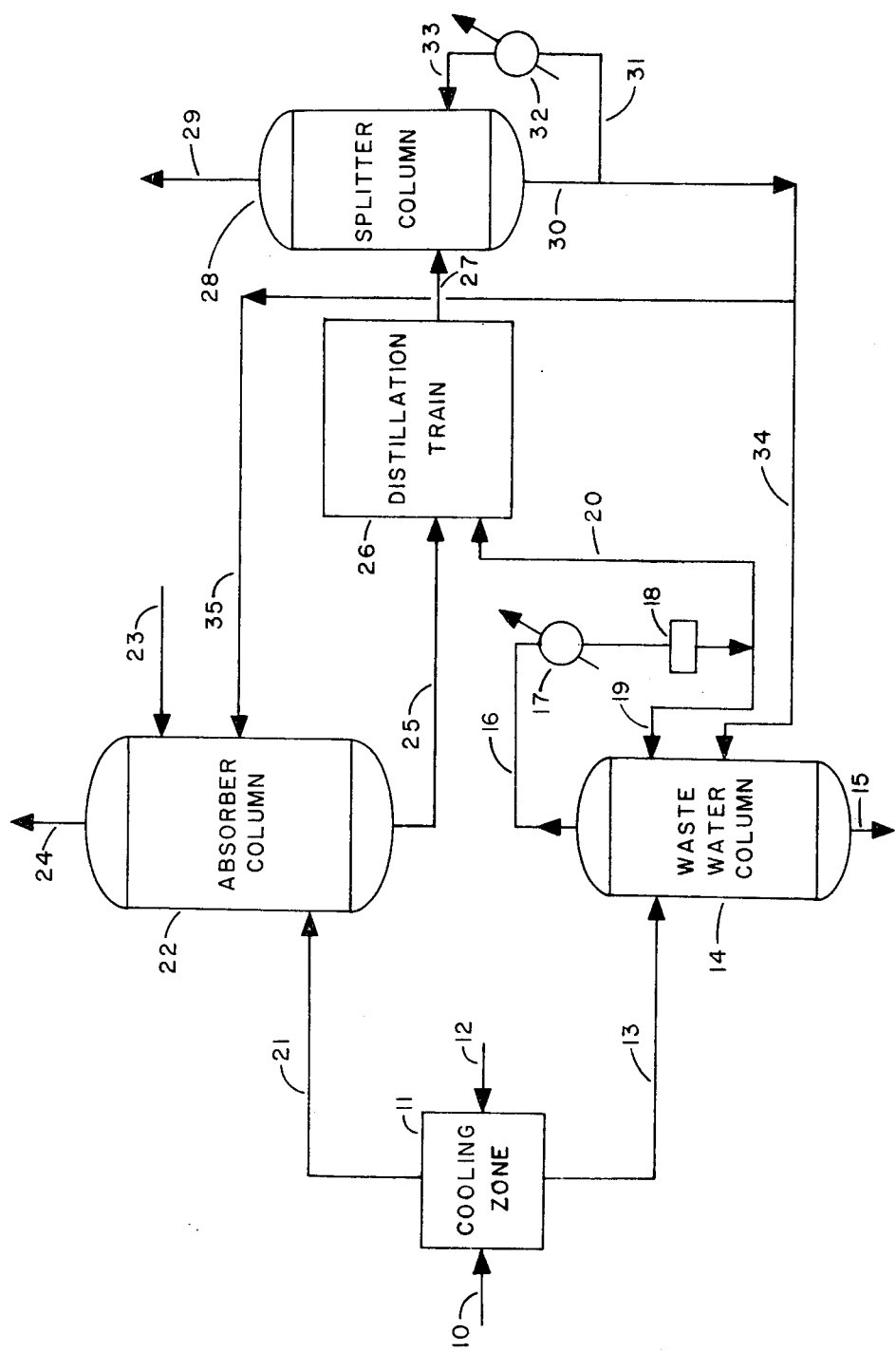

---

3,636,067
PURIFICATION OF ACRYLONITRILE BY ABSORPTION, PLURAL DISTILLATION AND RECYCLE OF BOTTOMS STREAM TO THE ABSORBER
Gordon H. Lovett, Texas City, and Ronald E. Rambin, Houston, Tex., assignors to Monsanto Company, St. Louis, Mo.
Filed Oct. 10, 1969, Ser. No. 865,314
Int. Cl. B01d 3/40; C07c 121/32
U.S. Cl. 260—465.3           8 Claims

ABSTRACT OF THE DISCLOSURE

A process for the reduction of the methacrylonitrile content of product acrylonitrile which comprises introducing at least a portion of a bottom fraction from an acrylonitrile heavy ends splitter column into an absorbing column, taking overhead from said absorbing column a fraction containing at least part of the methacrylonitrile, taking a bottom fraction from the absorbing column, removing the absorbing solvent from the bottom fraction and returning the acrylonitrile in the bottom fraction to the acrylonitrile heavy ends splitter column.

BACKGROUND OF THE INVENTION

The present invention relates to the production and purification of unsaturated nitriles. More particularly, the present invention relates to a process for the production and purification of acrylonitrile wherein the methacrylonitrile content of the acrylonitrile product is reduced.

The ammoxidation of olefins to produce unsaturated nitriles is well known. In particular, the production of acrylonitrile by the ammoxidation of propylene is a widely used commercial process. In the manufacture of acrylonitrile by the above process, numerous by-products and impurities are also made. While most of these by-products and impurities are removed in the purification steps commonly used in the process, certain impurities are difficult to remove and appear in the final product. For example, some users of acrylonitrile require that the methacrylonitrile content of the product be less than 500 p.p.m. It has been found difficult, however, to efficiently and economically reduce the methacrylonitrile content of the final product to a low level without incurring large acrylonitrile losses. Mere distillation of the acrylonitrile to remove the methacrylonitrile has been found not to be a satisfactory method of removal of the latter.

SUMMARY OF THE INVENTION

It is, therefore, an object of the present invention to provide an improved process for the purification of acrylonitrile.

It is a further object of the present invention to provide an improved process for the purification of acrylonitrile wherein the amount of methacrylonitrile in the final product is reduced.

Still another object of the present invention is to provide a method for the removal of methacrylonitrile from acrylonitrile product wherein the acrylonitrile losses are kept at a minimum.

These and other objects of the present invention will become apparent from the description given herein, the drawings and the appended claims. In accordance with the present invention, there is provided, in a process for the recovery of acrylonitrile produced by the ammoxidation of propylene wherein a hot reactor off-gas containing acrylonitrile and by-product methacrylonitrile is introduced into a water-cooling zone, an overhead off-gas fraction from said cooling zone is introduced at an intermediate point in a gas absorption zone, an absorbing solvent is introduced to said absorption zone at a point above the introduction point of said off-gas from said cooling zone, a bottom fraction containing said acrylonitrile, at least a portion of said methacrylonitrile and said absorbing solvent is removed from said absorption zone, the absorbing solvent is separated from said bottom fraction from said absorption zone in a distillation zone at a point above the feed point to said distillation zone, an improvement wherein the amount of methacrylonitrile in said stream of acrylonitrile is reduced comprising removing a bottom fraction from said distillation zone, recycling at least a portion of said bottom fraction from said distillation zone to a point in said absorption zone between the point of introduction of said off-gas from said cooling zone and the point of introduction of said adsorbing solvent.

BRIEF DESCRIPTION OF THE DRAWINGS

FIG. 2 is a diagrammatic flow diagram of a process for producing and recovering acrylonitrile utilizing the present invention.

DESCRIPTION OF THE PREFERRED EMBODIMENTS

Figure 1:
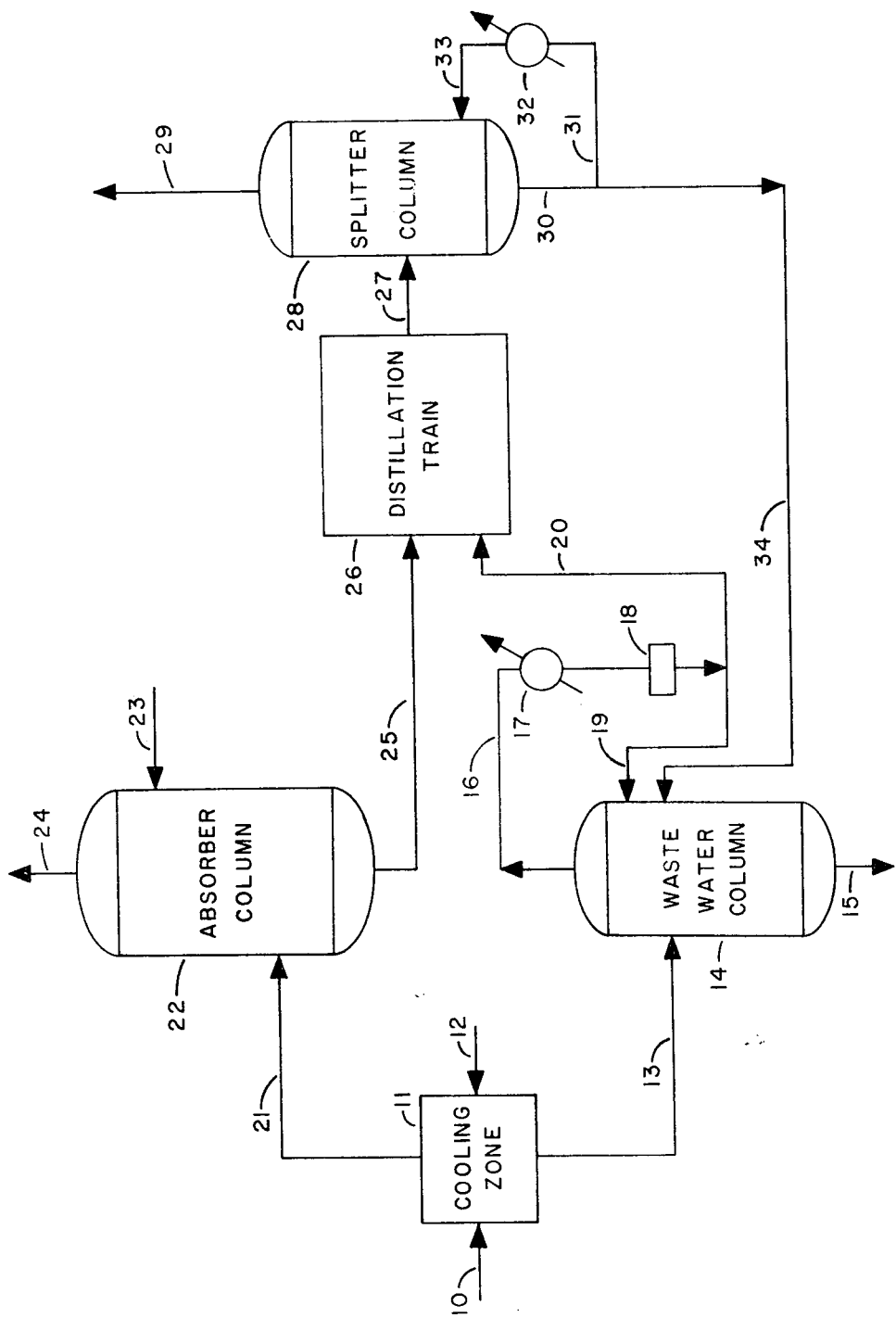
FIG. 1 is a diagrammatic flow diagram of a conventional process for the production and recovery of acrylonitrile.

As used herein when referring to distillation columns, absorbing columns and the like, the term intermediate point is defined as a point lying between the lowest and highest tray in a plate type column or between the extremes of the packing in a packed column. Reference is now made to FIG. 1 for description of a conventional process for producing acrylonitrile by the ammoxidation of propylene. Reactor off-gas containing acrylonitrile, methacrylonitrile, other unsaturated and saturated nitriles, unreacted starting materials and minor amounts of other impurities is fed to cooling zone 11 via line 10, water being fed to cooling zone 11 via line 12. A fraction from quench column 11 containing water and some organic material is removed via line 13 and passed to waste-water column 14, a distillation column used to separate the low-boiling or light organic material from the water and heavier organic components. The bottoms from waste-water column 14 are removed via line 15 and sent to waste disposal. An overhead fraction from waste-water column 14 is taken out via line 16, and condensed in condenser 17, the overhead condensate being collected in waste-water column drum 18. A portion of the condensate is recycled via line 19 to waste-water column 14, a second portion being sent via line 20 to distillation train 26 hereinafter described. The cooled reactor off-gas from cooling zone 11 leaves via line 21 and enters absorber column 22 where it is scrubbed countercurrently with absorbing solvent, generally water, entering the column via line 23. An overhead gas fraction containing carbon monoxide, carbon dioxide, nitrogen, unreacted propylene, propane and lesser amounts of other impurities is removed via line 24 and sent to vent. A bottom fraction containing primarily water, acrylonitrile, acetonitrile, hydrogen cyanide and lesser amounts of heavy organics is withdrawn from absorber column 22 via line 25 and sent to distillation train 26. Distillation train 26 comprises technology and apparatus well known and widely used in processes for producing acrylonitrile by the ammoxidation of propylene. In general, distillation train 26 will have an extractive distillation zone, several conventional distillation zones and various decanters and separators, all of which serve the purpose of removing the absorbing solvent, most of the heavy organic material, and the bulk of the light impurities from the acrylonitrile product. A stream from the distillation train containing primarily acrylonitrile passes via line 27 to acrylonitrile-heavy ends splitter column 28, a stream of acrylonitrile being removed via line 29 from a point of column 28 above the feed point and sent to storage or further processing. A bottom fraction is removed from column 28 via line 30, a portion being recycled via line 31, reboiler 32 and line 33 back to column 28, a portion, containing mainly heavier organic material and some acrylonitrile, being sent via line 34 to waste-water column 14 for removal of the heavy organics. In the system described above, while some of the methacrylonitrile produced in the reactor is removed initially in absorber 22 and also in distillation train 26, a significant amount of methacrylonitrile is carried into column 28 where it tends to concentrate in the bottom thereof, with the result that the stream removed via line 29 generally contains significant quantities of methacrylonitrile as an impurity.

Reference is now made to FIG. 2 showing the modification of the process set forth in FIG. 1 whereby the methacrylonitrile content of the acrylonitrile stream in line 29 is substantially reduced. The process as set forth in FIG. 2 is identical with that described in FIG. 1 with the exception that at least a portion of the bottom fraction removed from column 28 is recycled via line 35 to an intermediate point of absorber column 22, said point being between the point of introduction of the absorbing solvent and off-gas from cooling zone 11. Since the methacrylonitrile has concentrated in the bottom of column 28, the stream passing to absorber column 22 via line 35 is a methacrylonitrile rich stream. The bulk of the methacrylonitrile present in stream 35 upon entering absorber column 22 is carried overhead to vent line 24 whereas the bulk of the acrylonitrile present in the stream entering absorber column 22 via line 25 is removed via line 25 and again passes through the distillation train 26. As can be readily seen by this technique, the methacrylonitrile which would normally build up in the system and concentrate in column 28 is continuously removed from the system with the result that the acrylonitrile stream being removed from column 28 via line 29 contains substantially less methacrylonitrile.

The following non-limiting examples are given by way of illustration only.

EXAMPLE 1

The process scheme set forth in FIG. 1 was used to produce acrylonitrile from ammonia, propylene and oxygen using a typical ammoxidation catalyst. The absorber column used corresponding to column 22 was a 50-sieve tray column having a packed section above and below the trayed section. Lean water was introduced into the absorber at the fiftieth tray at a temperature of around 40° F., the temperature in the bottom of the absorber column being around 55° F. The distillation column corresponding to splitter column 28 was a 50-sieve tray tower operated at a bottom temperature of around 150° F. and a pressure of 10 p.s.i.a. The acrylonitrile product stream removed from column 28 was found to contain 500–1500 p.p.m. methacrylonitrile.

EXAMPLE 2

The process scheme as shown in FIG. 2 was used for the production of acrylonitrile. The absorber column and acrylonitrile-heavy ends splitter column, i.e., column 28, conditions were the same as those described in Example 1 with the exception that the total bottom fraction from column 28 was recycled via line 35 to a point in the lower half of absorber column 22. The methacrylonitrile content of the acrylonitrile stream removed via line 29 was found to be around 150 p.p.m. It was also found that the acrylonitrile losses in the absorber column by recycling the bottom fraction from column 28 were less than 150 lbs./hr.

In order that the maximum amount of methacrylonitrile be removed and the minimum amount of acrylonitrile be lost, it is preferred that the stream from the bottom of the splitter column be introduced into the absorber column at an intermediate point in the absorber. Generally speaking, the higher in the absorber that the recycle stream is introduced, the more efficient the removal of methacrylonitrile. By the same taken, the higher the introduction of the stream, the greater are the acrylonitrile losses. The optimum point of introduction of the recycle stream to the absorber will, of course, depend on the precise overall process conditions but will generally be in the lower half of the absorber-column. It is, of course, necessary that the recycle stream be introduced at a point between where the absorbing solvent is introduced and the point where the off-gas from the cooling zone is introduced.

The absorber column can be either of the packed type or of the plate type or, in fact, can be a combination plate-packed type. Preferably, the absorption tower will be of the plate or tray type which in turn can either be of the bubble cap, sieve plate, shower tray, etc., type. In an especially preferred embodiment, the absorption tower utilizes sieve trays. When a plate type absorber is employed, it will generally have from 30–100 trays and more preferably from 40–70 trays. In general, the absorber will operate such that from 1–5 moles of absorbing solvent is fed to the absorber per mole of off-gas from the cooling zone entering the absorber. The amount of recycle stream from the acrylonitrile-heavy ends splitter column entering the absorber will, of course, vary depending upon the degree of removal of methacrylonitrile desired and other process variables. While in the embodiment described in FIG. 2 a portion of the bottom stream from the splitter column is recycled to the absorber column, it is to be understood that the entire bottom stream from the splitter column can be recycled if desired as is demonstrated by Example 2. It is preferable in some cases that only a portion of the bottom stream be recycled to avoid the buildup of materials heavier than methacrylonitrile in the distillation train. Usually, the amount of the bottoms stream recycled to the absorber will be from 20 to 80% by weight of the total bottom stream. Temperatures in the absorber column will range from 40–70° F. in the bottom. Pressures in the absorber are, in general, kept as high as possible, consistent with good reactor operation but will normally range from 15 to 30 p.s.i.a. While other liquids such as mehylcarbitol, methylcellosolve, ethylene glycol and the like can be employed as the absorbing solvent, usually the absorbing solvent will comprise at least 80% by weight water.

The distillation zone which is basically a zone to separate the remaining heavy ends from the acrylonitrile can comprise any distillation column normally used for separation and purification and can be of either the packed or plate type. Preferably, the acrylonitrile-heavy ends splitter column, i.e., the distillation zone, will comprise a plate-type column having from 30–100 trays and in an especially preferred embodiment employs sieve trays although bubble-cap trays may be employed. The acrylonitrile stream is removed from a point in the column above the feed point to the column and in the preferred case from the upper half of the column. The temperatures in the column are dependent upon the amount and type of impurities found in the bottom section but will in general range between 130–180° F. at a pressure of from about 5 to about 15 p.s.i.a. It is to be understood, however, that temperatures and pressure ranges other than those noted above can be employed depending on the impurities present and other process variables.

What is claimed is:

1. In a process for the recovery of acrylonitrile produced by the ammoxidation of propylene wherein a hot reactor off-gas containing acrylonitrile and by-product methacrylonitrile is introduced into a water-cooling zone, an overhead off-gas fraction from said cooling zone is introduced at an intermediate point in a gas absorption zone, an absorbing solvent is introduced to said absorption zone at a point above the introduction point of said off-gas from said cooling zone, a bottom fraction containing said acrylonitrile, at least a portion of said methacrylonitrile and said absorbing solvent is removed from said absorption zone, the absorbing solvent is separated from said bottom fraction from said absorption zone in a distillation train and said acrylonitrile is subsequently separated from the bulk of said methacrylonitrile in a distillation zone, a stream of acrylonitrile being withdrawn from said distillation zone at a point above the feed point to said distillation zone, the improvement wherein the amount of methacrylonitrile in said stream of acrylonitrile is reduced comprising removing a bottom fraction from said distillation zone, recycling at least a portion of said bottom fraction from said distillation zone to a point in said absorption zone between the point of introduction of said off-gas from said cooling zone and the point of introduction of said absorbing solvent.

2. The process of claim 1 wherein said distillation zone comprises a distillation column having from 30 to 100 trays.

3. The process of claim 2 wherein said trays are seive trays.

4. The process of claim 1 wherein said gas absorption zone comprises an absorption column having from 30 to 100 trays.

5. The process of claim 4 wherein said trays are sieve trays.

6. The process of claim 5 wherein said bottom fraction from said distillation zone is introduced into said absorption column in the lower half of said column.

7. The process of claim 6 wherein from 20 to 80% by weight of the bottom fraction of said distillation zone is introduced into said absorption column.

8. The process of claim 7 wherein said absorbing solvent contains at least 80% by weight water.

References Cited
UNITED STATES PATENTS

| | | | |
|---|---|---|---|
| 2,733,259 | 1/1956 | DeCroes et al. | 203—42 |
| 2,838,560 | 6/1958 | Luscher et al. | 260—465.3 |
| 3,399,120 | 8/1968 | Lovett | 203—96 |
| 3,462,477 | 8/1969 | Caporali et al. | 260—465.3 |
| 3,535,849 | 10/1970 | Hausweiler et al. | 203—42 |

WILBUR L. BASCOMB, JR., Primary Examiner

U.S. Cl. X.R.

203—42, 82, 85, 83, DIG. 3, 97, 98; 260—465.9

UNITED STATES PATENT OFFICE
CERTIFICATE OF CORRECTION

Patent No. 3,636,067               Dated January 18, 1972

Inventor(s) Gordon H. Lovett and Ronald E. Rambin

It is certified that error appears in the above-identified patent and that said Letters Patent are hereby corrected as shown below:

COLUMN 2, line 7, after the word "distillation" add -- train and said acrylonitrile is subsequently separated from the bulk of said methacrylonitrile in a distillation zone, a stream of acrylonitrile being withdrawn from said distillation --

COLUMN 3, line 29, after the word "vent", add -- via --

COLUMN 4, line 42, after the word "as" change "mehylcarbitol" to -- methylcarbitol --

Signed and sealed this 5th day of September 1972.

(SEAL)
Attest:

EDWARD M. FLETCHER, JR.                ROBERT GOTTSCHALK
Attesting Officer                       Commissioner of Patents